(12) United States Patent
Du et al.

(10) Patent No.: US 10,229,590 B2
(45) Date of Patent: Mar. 12, 2019

(54) SYSTEM AND METHOD FOR IMPROVED OBSTABLE AWARENESS IN USING A V2X COMMUNICATIONS SYSTEM

(71) Applicant: GM GLOBAL TECHNOLOGY OPERATIONS LLC, Detroit, MI (US)

(72) Inventors: Jiang Du, Beaverton, OR (US); Fan Bai, Ann Arbor, MI (US); Donald K. Grimm, Uitca, MI (US); Wende Zhang, Troy, MI (US); Xi Ju, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/676,575

(22) Filed: Aug. 14, 2017

(65) Prior Publication Data
US 2019/0051168 A1 Feb. 14, 2019

(51) Int. Cl.
*G08G 1/09* (2006.01)
*G08G 1/017* (2006.01)
*G08G 1/01* (2006.01)
*G08G 1/16* (2006.01)

(52) U.S. Cl.
CPC ............. *G08G 1/09* (2013.01); *G08G 1/017* (2013.01); *G08G 1/0112* (2013.01); *G08G 1/161* (2013.01)

(58) Field of Classification Search
CPC ........ G08G 1/09; G08G 1/0112; G08G 1/017; G08G 1/161
USPC ......................................................... 701/117
See application file for complete search history.

(56) References Cited

U.S. PATENT DOCUMENTS

| | | | |
|---|---|---|---|
| 2011/0087433 A1* | 4/2011 | Yester ................. | G08G 1/163 701/301 |
| 2012/0086582 A1* | 4/2012 | Durekovic ............ | G08G 1/161 340/903 |
| 2016/0091328 A1* | 3/2016 | Ould-Ahmen-Vall ...................... | G01C 21/3415 701/117 |
| 2017/0008521 A1* | 1/2017 | Braunstein .......... | G01C 21/32 |
| 2017/0116862 A1* | 4/2017 | Inoue .................. | G01C 21/34 |
| 2017/0132923 A1* | 5/2017 | Li ........................ | G08G 1/0112 |
| 2018/0101172 A1* | 4/2018 | Min ..................... | G05D 1/0088 |
| 2018/0137759 A1* | 5/2018 | Oh ....................... | G08G 1/166 |

* cited by examiner

*Primary Examiner* — Marthe Y Marc-Coleman (57) ABSTRACT

A system and method is taught for collaborative vehicle to all (V2X) communications to improve autonomous driving vehicle performance in a heterogeneous capability environment by sharing capabilities among different vehicles. In particular, the system and method are operative to facilitate path planning contention resolution among a plurality of road uses within a road segment by facilitating the election and transition of a segment leader to arbitrate conflicts.

20 Claims, 9 Drawing Sheets

SYSTEM AND METHOD FOR IMPROVED OBSTABLE AWARENESS IN USING A V2X COMMUNICATIONS SYSTEM

TECHNICAL FIELD

The present disclosure relates to vehicles controlled by automated driving systems, particularly those configured to automatically control vehicle steering, acceleration, and braking during a drive cycle without human intervention. In particular, the present disclosure teaches a system and method for collaborative vehicle to all (V2X) communications to improve autonomous driving vehicle performance in a heterogeneous capability environment by sharing capabilities among different vehicles.

INTRODUCTION

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Appropriate situation awareness is essential for autonomous driving due to safety concerns. Even though it is desirable to put all available information into autonomous driving decision process; however, for practical implementation, input data to the system should be limited and manageable; therefore it needs to be well-designed for both efficiency and sufficiency for decision making. An autonomous vehicle generally must generate a data structure to perceive situations around the vehicle. However some areas are blocked from being perceived by the vehicle sensors and therefore cannot be accurately implemented in localization and mapping. In addition, some vehicles and other objects do not employ vehicle to vehicle communications and therefore may not be detectable by some vehicles in a conjected area. It would be desirable to overcome these limitations in order to generate improved situational awareness and path planning.

SUMMARY

Embodiments according to the present disclosure provide a number of advantages. For example, embodiments according to the present disclosure may enable independent validation of autonomous vehicle control commands to aid in diagnosis of software or hardware conditions in the primary control system. Embodiments according to the present disclosure may thus be more robust, increasing customer satisfaction.

The present disclosure describes a method comprising determining a road segment, determining a first road user and a second road user within the road segment, receiving a first route data from the first road user and a second route data from the second road user, determining a conflict in response to the first route data and the second route data, determining a segment leader in response to determining the conflict, arbitrating the conflict to generate an instruction, and transmitting the instruction in response to arbitrating the conflict and determining the segment leader.

Another aspect of the present disclosure describes an apparatus comprising a receiver from receiving an first route data from a first road user and a second route data from a second road user, a processor for determining a road segment, determining a first road user and a second road user within the road segment, determining a conflict in response to the first route data and the second route data, determining a segment leader in response to determining the conflict, and arbitrating the conflict to generate an instruction, and a transmitter for transmitting the instruction to the first road user and the second road user Another aspect of the present disclosure describes a method of path planning contention resolution comprising receiving a first location data, a first operational data, and a first intended route data from a first road user and a second location data, a second operational data, and a second intended route data from a second road user, determining a user group in response to the first location data and the second location data, determining a conflict in response to the first intended route data and the second intended route data, determining a group leader in response to the first operational data and the second operational data, determining a resolution to the conflict and transmitting the resolution to the first road user and the second road user The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
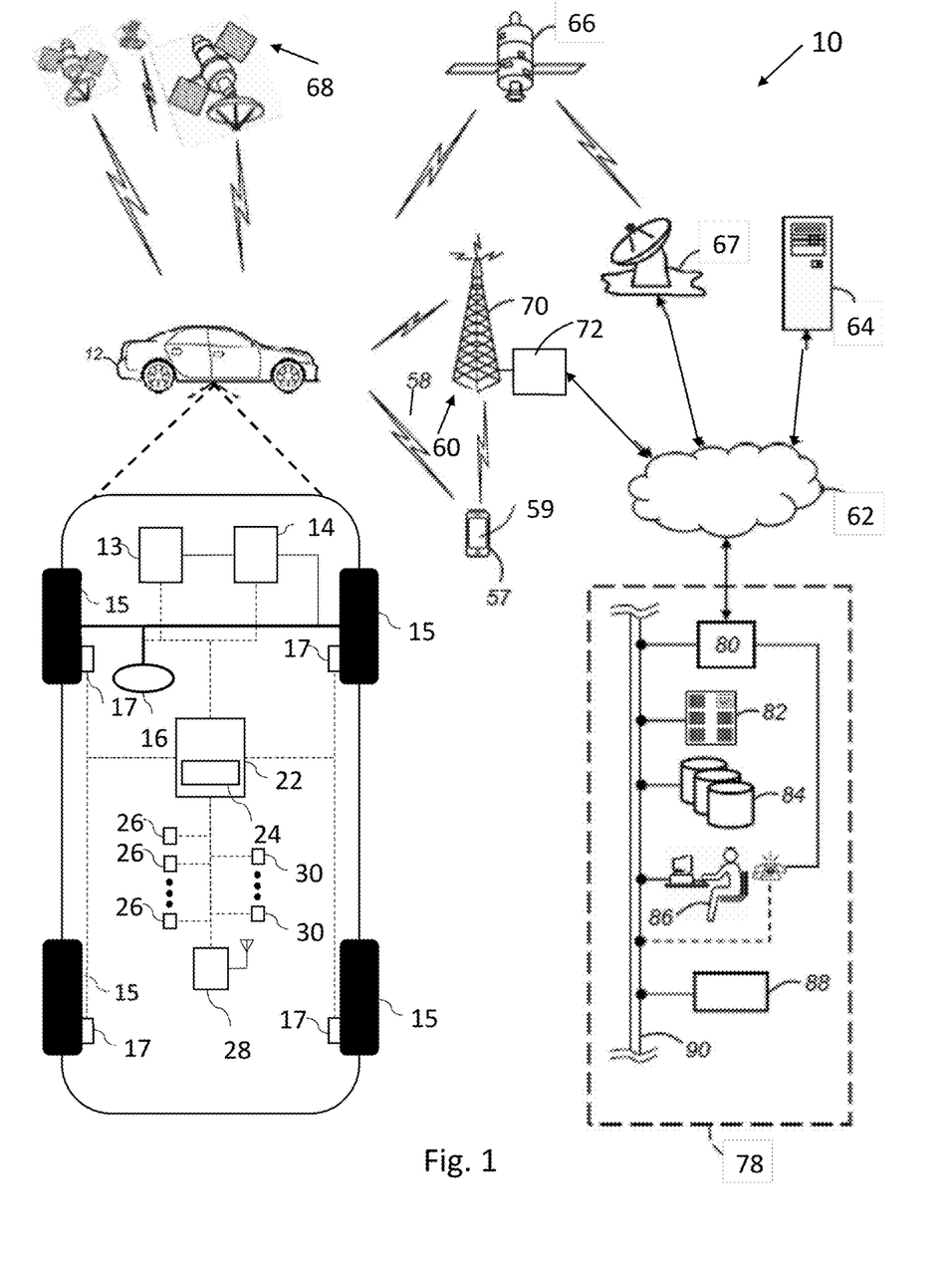
FIG. 1 is a schematic diagram of a communication system including an autonomously controlled vehicle, according to an embodiment.

FIG. 1 schematically illustrates an operating environment that comprises a mobile vehicle communication and control system 10 for a motor vehicle 12. The communication and control system 10 for the vehicle 12 generally includes one or more wireless carrier systems 60, a land communications network 62, a computer 64, a networked wireless device 57 including but not limited to a smart phone, tablet, or wearable device such as a watch, and a remote access center 78.

The vehicle 12, shown schematically in FIG. 1, includes a propulsion system 13, which may in various embodiments include an internal combustion engine, an electric machine such as a traction motor, and/or a fuel cell propulsion system. Vehicle 12 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used.

The vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 12 additionally includes a steering system 16. While depicted as including a steering wheel for illustrative purposes, in some embodiments contemplated within the scope of the present disclosure, the steering system 16 may not include a steering wheel.

The vehicle 12 includes a wireless communications system 28 configured to wirelessly communicate with other vehicles ("V2V") and/or infrastructure ("V2I"). In an exemplary embodiment, the wireless communication system 28 is configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor such as a central processing unit (CPU) or graphics processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

FIG. 1 illustrates several networked devices that can communicate with the wireless communication system 28 of the vehicle 12. One of the networked devices that can communicate with the vehicle 12 via the wireless communication system 28 is the networked wireless device 57. The networked wireless device 57 can include computer processing capability, a transceiver capable of communicating using a short-range wireless protocol, and a visual display 59. The computer processing capability includes a microprocessor in the form of a programmable device that includes one or more instructions stored in an internal memory structure and applied to receive binary input to create binary output. In some embodiments, the networked wireless device 57 includes a GPS module capable of receiving GPS satellite signals and generating GPS coordinates based on those signals. In other embodiments, the networked wireless device 57 includes cellular communications functionality such that the networked wireless device 57 carries out voice and/or data communications over the wireless carrier system 60 using one or more cellular communications protocols, as are discussed herein. The visual display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC 72 either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide uni-directional or bi-directional communication with the vehicle 12. This can be done using one or more communication satellites 66 and an uplink transmitting station 67. Uni-directional communication can include, for example, satellite radio services, wherein programming content (news, music, etc.) is received by the transmitting station 67, packaged for upload, and then sent to the satellite 66, which broadcasts the programming to subscribers. Bi-directional communication can include, for example, satellite telephony services using the satellite 66 to relay telephone communications between the vehicle 12 and the station 67. The satellite telephony can be utilized either in addition to or in lieu of the wireless carrier system 60.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), or networks providing broadband wireless access (BWA), or any combination thereof. Furthermore, the remote access center 78 need not be connected via land network 62, but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the vehicle 12 via the wireless communication system 28 and the wireless carrier 60. Other computers 64 can include, for example: a service center computer where diagnostic information and other vehicle data can be uploaded from the vehicle via the wireless communication system 28 or a third party repository to or from which vehicle data or other information is provided, whether by communicating with the vehicle 12, the remote access center 78, the networked wireless device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the vehicle 12.

The remote access center 78 is designed to provide the wireless communications system 28 of the vehicle 12 with a number of different system functions and, according to the exemplary embodiment shown in FIG. 1, generally includes one or more switches 80, servers 82, databases 84, live advisors 86, as well as an automated voice response system (VRS) 88. These various remote access center components are preferably coupled to one another via a wired or wireless local area network 90. The switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and the network 90. Data transmissions are passed via the modem to the server 82 and/or the database 84. The database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned remote access center 78 using the live advisor 86, it will be appreciated that the remote access center can instead utilize the VRS 88 as an automated advisor, or a combination of the VRS 88 and the live advisor 86 can be used.

Figure 2:
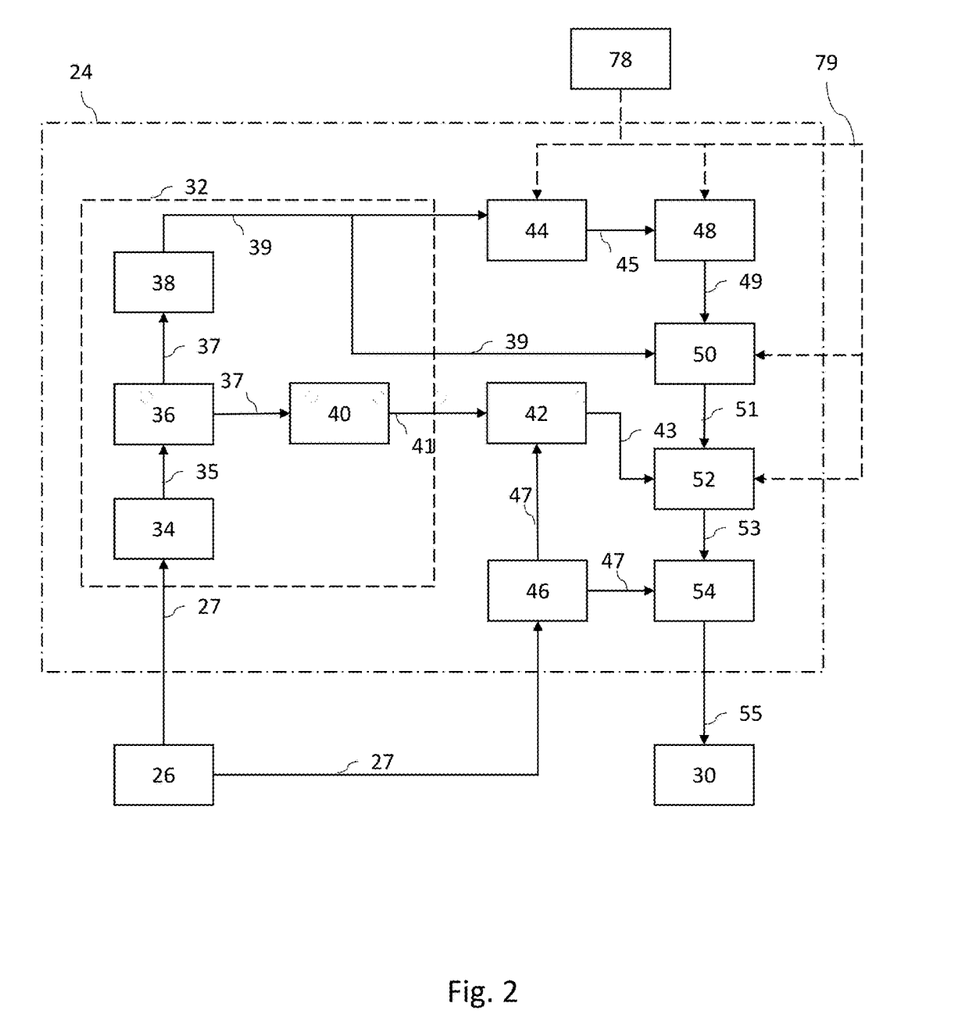
FIG. 2 is a schematic block diagram of an automated driving system (ADS) for a vehicle, according to an embodiment.

As shown in FIG. 2, the ADS 24 includes multiple distinct control systems, including at least a perception system 32 for determining the presence, location, classification, and path of detected features or objects in the vicinity of the vehicle. The perception system 32 is configured to receive inputs from a variety of sensors, such as the sensors 26 illustrated in FIG. 1, and synthesize and process the sensor inputs to generate parameters used as inputs for other control algorithms of the ADS 24.

The perception system 32 includes a sensor fusion and preprocessing module 34 that processes and synthesizes sensor data 27 from the variety of sensors 26. The sensor fusion and preprocessing module 34 performs calibration of the sensor data 27, including, but not limited to, LIDAR to LIDAR calibration, camera to LIDAR calibration, LIDAR to chassis calibration, and LIDAR beam intensity calibration. The sensor fusion and preprocessing module 34 outputs preprocessed sensor output 35.

A classification and segmentation module 36 receives the preprocessed sensor output 35 and performs object classification, image classification, traffic light classification, object segmentation, ground segmentation, and object tracking processes. Object classification includes, but is not limited to, identifying and classifying objects in the surrounding environment including identification and classification of traffic signals and signs, RADAR fusion and tracking to account for the sensor's placement and field of view (FOV), and false positive rejection via LIDAR fusion to eliminate the many false positives that exist in an urban environment, such as, for example, manhole covers, bridges, overhead trees or light poles, and other obstacles with a high RADAR cross section but which do not affect the ability of the vehicle to travel along its path. Additional object classification and tracking processes performed by the classification and segmentation model 36 include, but are not limited to, freespace detection and high level tracking that fuses data from RADAR tracks, LIDAR segmentation, LIDAR classification, image classification, object shape fit models, semantic information, motion prediction, raster maps, static obstacle maps, and other sources to produce high quality object tracks.

The classification and segmentation module 36 additionally performs traffic control device classification and traffic control device fusion with lane association and traffic control device behavior models. The classification and segmentation module 36 generates an object classification and segmentation output 37 that includes object identification information.

A localization and mapping module 40 uses the object classification and segmentation output 37 to calculate parameters including, but not limited to, estimates of the position and orientation of vehicle 12 in both typical and challenging driving scenarios. These challenging driving scenarios include, but are not limited to, dynamic environments with many cars (e.g., dense traffic), environments with large scale obstructions (e.g., roadwork or construction sites), hills, multi-lane roads, single lane roads, a variety of road markings and buildings or lack thereof (e.g., residential vs. business districts), and bridges and overpasses (both above and below a current road segment of the vehicle).

The localization and mapping module 40 also incorporates new data collected as a result of expanded map areas obtained via onboard mapping functions performed by the vehicle 12 during operation and mapping data "pushed" to the vehicle 12 via the wireless communication system 28. The localization and mapping module 40 updates previous map data with the new information (e.g., new lane markings, new building structures, addition or removal of constructions zones, etc.) while leaving unaffected map regions unmodified. Examples of map data that may be generated or updated include, but are not limited to, yield line categorization, lane boundary generation, lane connection, classification of minor and major roads, classification of left and right turns, and intersection lane creation.

In some embodiments, the localization and mapping module 40 uses SLAM techniques to develop maps of the surrounding environment. SLAM is an acronym for Simultaneous Localization and Mapping. SLAM techniques construct a map of an environment and track an object's position within the environment. GraphSLAM, a variant of SLAM, employs sparse matrices which are used to produce a graph containing observation interdependencies.

Object position within a map is represented by a Gaussian probability distribution centered around the object's predicted path. SLAM in its simplest form utilizes three constraints: an initial location constraint; a relative motion constraint, which is the object's path; and a relative measurement constraint, which is one or more measurements of an object to a landmark.

The initial motion constraint is the initial pose (e.g., position and orientation) of the vehicle, which consists of the vehicle's position in two or three dimensional space including pitch, roll, and yaw data. The relative motion constraint is the displaced motion of the object which contains a degree of flexibility to accommodate map consistency. The relative measurement constraint includes one or more measurements from the object sensors to a landmark. The initial location constraint, the relative motion constraint, and the relative measurement constraint are typically Gaussian probability distributions. Object locating methods within a sensor-generated map typically employ Kalman filters, various statistical correlation methods such as the Pearson product-moment correlation, and/or particle filters.

A vehicle odometry module 46 receives data 27 from the vehicle sensors 26 and generates a vehicle odometry output 47 which includes, for example, vehicle heading, velocity, and distance information. An absolute positioning module 42 receives the localization and mapping output 41 and the vehicle odometry information 47 and generates a vehicle location output 43 that is used in separate calculations as discussed below.

An object prediction module 38 uses the object classification and segmentation output 37 to generate parameters including, but not limited to, a location of a detected obstacle relative to the vehicle, a predicted path of the detected obstacle relative to the vehicle, and a location and orientation of traffic lanes relative to the vehicle. Bayesian models may be used in some embodiments to predict driver or pedestrian intent based on semantic information, previous trajectory, and instantaneous pose, where pose is the combination of the position and orientation of an object.

Commonly used in robotics, Bayes' Theorem, also referred to as a Bayesian filter, is a form of conditional probability Bayes' Theorem is commonly used recursively when iterated. On each new iteration, the previous posterior becomes the prior to produce a new posterior until the iteration is complete. Data on the predicted path of objects (including pedestrians, surrounding vehicles, and other moving objects) is output as an object prediction output 39 and is used in separate calculations as discussed below.

The ADS 24 also includes an observation module 44 and an interpretation module 48. The observation module 44 generates an observation output 45 received by the interpretation module 48. The observation module 44 and the interpretation module 48 allow access by the remote access center 78. A live expert or advisor, e.g. the advisor 86 illustrated in FIG. 1, can optionally review the object prediction output 39 and provide additional input and/or override automatic driving operations and assume operation of the vehicle if desired or required by a vehicle situation. The interpretation module 48 generates an interpreted output 49 that includes additional input provided by the live expert, if any. The interpretation module may include a cognitive processor including a working Memory and an episodic memory. The cognitive processor is operative to provide efficient situation awareness, and a system for storing and recalling situation awareness from previous experiences.

A path planning module 50 processes and synthesizes the object prediction output 39, the interpreted output 49, and additional routing information 79 received from an online database or live expert of the remote access center 78 to determine a vehicle path to be followed to maintain the vehicle on the desired route while obeying traffic laws and avoiding any detected obstacles. The path planning module 50 employs algorithms configured to avoid any detected obstacles in the vicinity of the vehicle, maintain the vehicle in a current traffic lane, and maintain the vehicle on the desired route. The path planning module 50 uses pose-graph optimization techniques, including non-linear least square pose-graph optimization, to optimize the map of car vehicle trajectories in six degrees of freedom and reduce path errors. The path planning module 50 outputs the vehicle path information as path planning output 51. The path planning output 51 includes a commanded vehicle path based on the vehicle route, vehicle location relative to the route, location and orientation of traffic lanes, and the presence and path of any detected obstacles.

A first control module 52 processes and synthesizes the path planning output 51 and the vehicle location output 43 to generate a first control output 53. The first control module 52 also incorporates the routing information 79 provided by the remote access center 78 in the case of a remote take-over mode of operation of the vehicle.

A vehicle control module 54 receives the first control output 53 as well as velocity and heading information 47 received from vehicle odometry 46 and generates vehicle control output 55. The vehicle control output 55 includes a set of actuator commands to achieve the commanded path from the vehicle control module 54, including, but not limited to, a steering command, a shift command, a throttle command, and a brake command.

The vehicle control output 55 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

It should be understood that the disclosed methods can be used with any number of different systems and is not specifically limited to the operating environment shown here. The architecture, construction, setup, and operation of the system 10 and its individual components is generally known. Other systems not shown here could employ the disclosed methods as well.

When generating the local area map, the localization and mapping module 40 is limited to data collected by the suite of sensors, which generally includes real time data pertinent to the area around the vehicle, and data received via the wireless communication system from a central data provider, which is updated less frequently. However, the localization and mapping module cannot perceive areas that are not visible to the sensors in real time. In some cases, the capabilities (sensing, computing power, network performance) of the vehicle system vary due to either product cost consideration or technology availability. For example, some vehicles may use 16 line LiDAR vs 64 line LiDAR due to cost consideration. Some vehicles may employ processors with lower capabilities and therefore the quantity of data that can be processed is less. It would be desirable to share available data in real time to vehicles which may not have access to this data traditionally.

Figure 3:
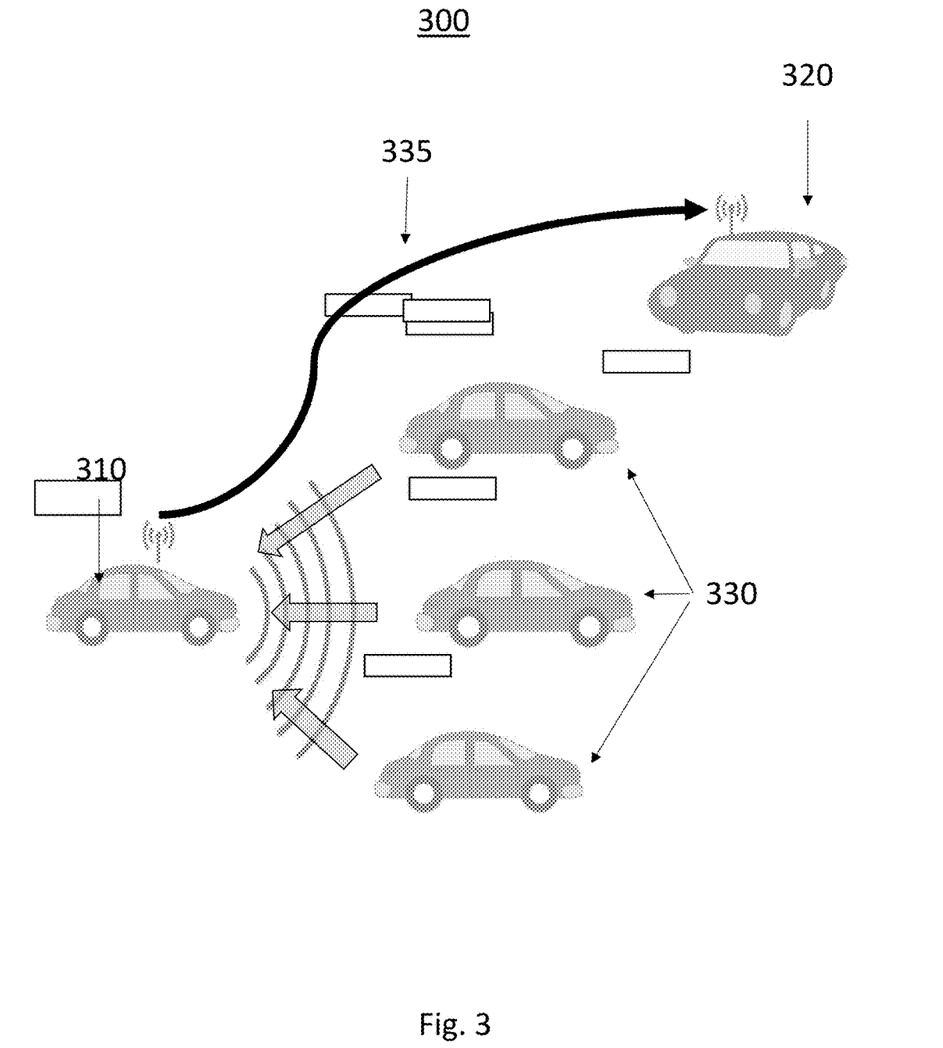
FIG. 3 illustrates an exemplary environment for sharing data between vehicles.

Turning now to FIG. 3 an exemplary system 300 for sharing data between vehicles is shown. The system may employ vehicle to vehicle (V2V), vehicle to infrastructure (V2I), vehicle to pedestrian (V2P) or vehicle to cloud (V2C) communications. Via V2X (including V2V, V2I and V2C), the different autonomous driving vehicles can share their unique capability which will result overall system performance improvement, from sensing, fusion, to planning and state management. In the exemplary information distribution system, a first vehicle 310 transmits a V2X safety message to a second vehicle 320. The safety message may include location, speed, direction and object type. In addition to its own V2X safety message the first vehicle 320 can sending safety messages of other road users 330 it detects from the vehicle sensors. Thus the transmission 335, may include a transmission block that identifies other road users with information such as location, speed, direction, type, etc., or the first vehicle may generate a V2X safety message for each detected road user 330 when no V2X safety message has been detector for that road user. This system and method has the desirable effect of increasing the penetration rate of the safety messages per given V2X Hardware, as one vehicle reports V2X safety messages of several road users.

Figure 4:
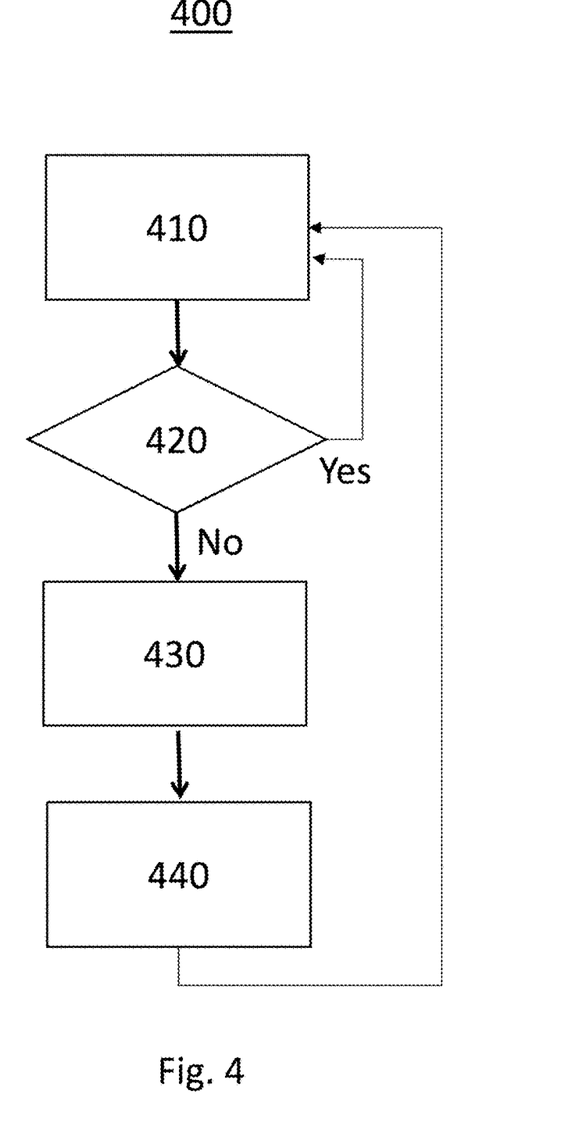
FIG. 4 shows a flow chart indicative of an exemplary method for sharing data between vehicles.

Turning now to FIG. 4 an exemplary method 400 for sharing data between vehicles is shown. The method is first operative to determine information 410 concerning a proximate road user. The information may include location of the road user, speed and direction of travel, type of road user, sensing capabilities of road user, autonomous capabilities of road user, and the like. The method is then operative to determine if a safety message has been broadcast or transmitted by the road user 420. If a safety message has been detected, the method returns to determining information 410 concerning a proximate road user. This information may be used to implement the host vehicles data map and as an input to the host vehicles autonomous control system.

If the method has not detected a safety message from the proximate road user, the method is then operative to generate a safety message including the information concerning the proximate road user 430. This safety message may be a message containing information only concerning the proximate road user, or may be an addendum to the safety message of the host vehicle. The safety message may include an indication that the safety message was not generated by the proximate road user. The method is then operative to transmit the safety message 440 and return to monitoring proximate road users.

Figure 5:
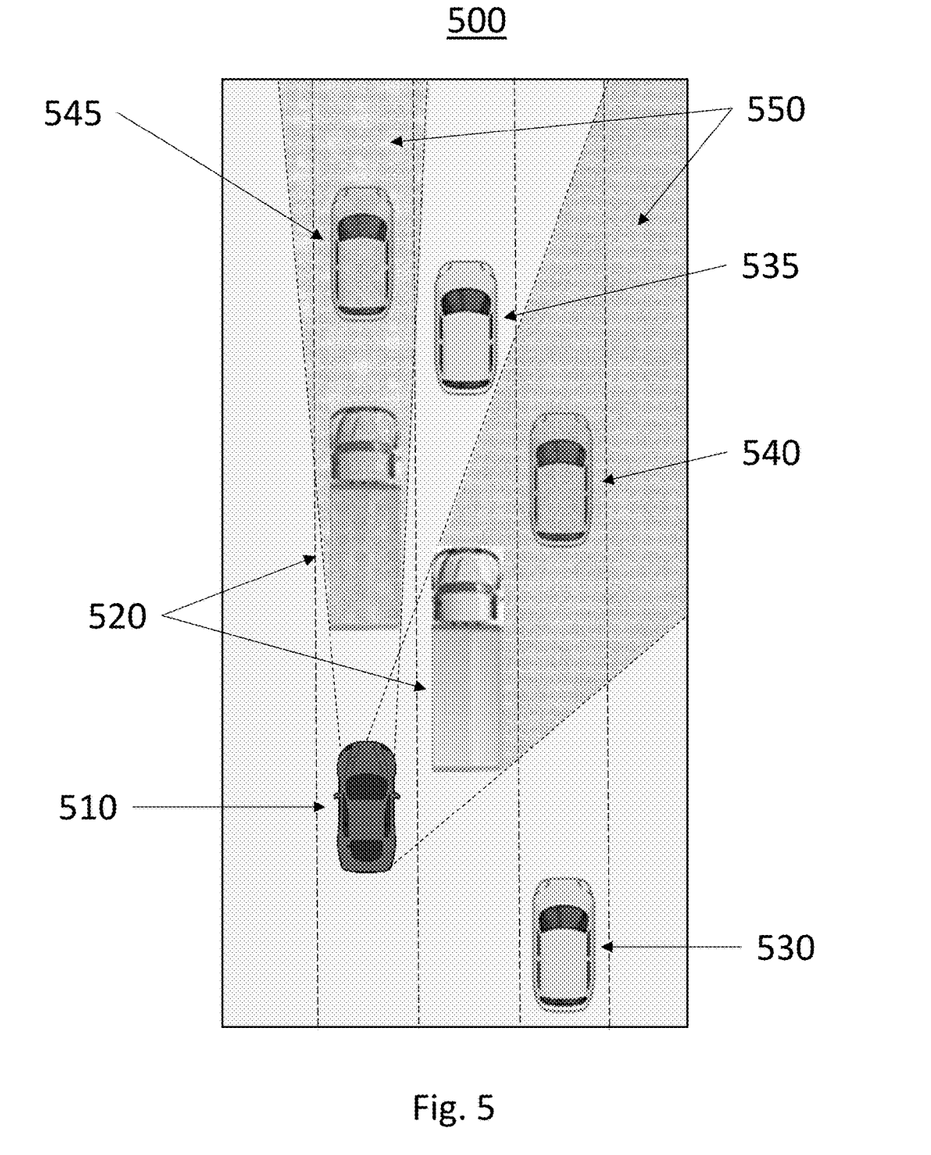
FIG. 5 illustrates an exemplary environment for cooperative detection and image generation.

Turning now to FIG. 5, an exemplary environment for cooperative detection and image generation 500 is shown. The system employed by a first vehicle 510 is operative to use a camera system, sensor system or other detection system to capture images and objects, such as vehicles or other road users, in its proximate area, to receive images and other data from other road uses, and to combine these images and data. The system may be further operative to generate a display of the combined data.

In an exemplary embodiment, the first vehicle 510 employing a 360 degree camera detection system when travelling in a congested area will have a clear line of sight to some proximate objects 520, 530, 535, and will have an obstructed view 550 to some other proximate objects 540, 545. The system will use the detected information to generate an obstacle map of the local area, but some areas will be left as uncertain. Objects may be assumed to be in an obstructed area when implementing projected path algorithms of previously detected objects. For example, if a slower moving vehicle was detected ahead of a proximate vehicle, and then the proximate vehicle moved between the vehicle and the slower moving vehicle, the slower moving vehicle can be assumed to be on the other side of the proximate vehicle. In addition, the proximate vehicle may generate an obstacle map relative to the proximate vehicles position and then broadcast this obstacle map to other vehicles via a V2X system or a dedicated short range communications (DSRC) system. In this fashion, by using the intelligent fusion capability between v2x communication and ego-sensing technology, such as a camera, the first vehicle 510 could detect and perceive the vehicle 540, 545, which is in an obstructed view 550 to first vehicle 510.

The augmented obstacle map may be displayed as a top down view as shown according to FIG. 5 where representation of obstructed view obstacles are populated in the map, giving the user or the autonomous vehicle a more complete picture of proximate objects. The augmented obstacle map may show objects detected by other vehicles as a different color or some other distinguishing attribute. The augmented obstacle map may further indicate areas of obstructed view 550 thereby providing notice to a use that objects may be present in the obstructed view area that may not be accounted for by the augmented obstacle map.

Figure 6:
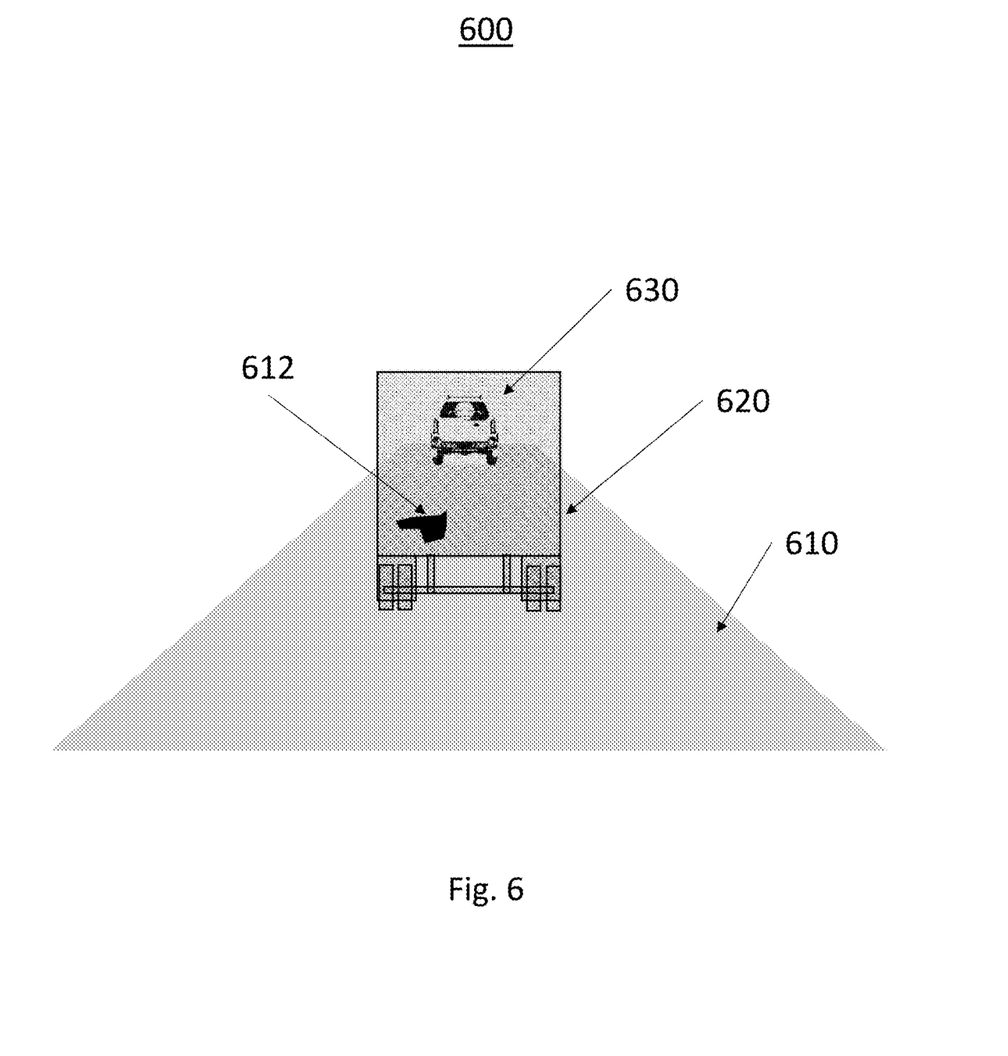
FIG. 6 shows an exemplary display for cooperative detection and image generation.
Figure 7:
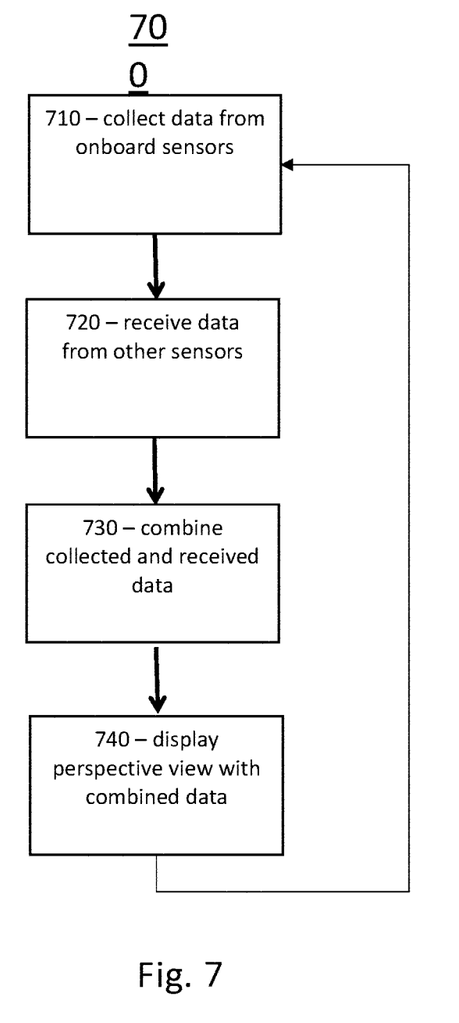
FIG. 7 shows a flow chart indicative of an exemplary method for displaying data shared between vehicles.

Turning now to FIG. 6, an exemplary display for cooperative detection and image generation 600 is shown. The augmented obstacle information received by the vehicle may be presented in an augmented drivers view format. In this exemplary embodiment, images captured by a forward facing camera system on the host vehicle may be presented in an opaque manner, with augmented camera views from other vehicles presented in a solid manner. For example, a truck 620 detected in the camera view from the host vehicle may be presented as translucent, wherein a car 630 in front of the truck 620, detected by the camera on a truck, with the video transmitted via DSRC may be presented as solid. The road surface 610 may be displayed and/or computer generated and may indicate road markers or road hazards 612 wherein data concerning the road markers or road hazards 612 is received though an alternative transmission method, such as cellular wireless transmission. Another method for display is a bird view or top down image that combined the perceived road users that present in the first image and in the second image respectively. This bird view image may be used to implement the host vehicles data map and as an input to the host vehicles autonomous control system Turning now to FIG. 7 an exemplary method 700 for displaying data shared between vehicles is shown. The method is first operative to collect data 710 from onboard sensors such as cameras, LiDAR sensors and radar. The collected data may include a front view from a camera. The method is then operative to receive data from other sources 720, such as proximate vehicles or infrastructure. The received data may be a camera view from a proximate vehicle. The method then combines the collected data and the received data and generates a perspective view 730. The perspective view may use common markers within the video or image to align the collected data and the received data 730. In addition correlation and similarity of neighbor vectors in both domains may be used to determine vehicle (Vi) on V2X space and vehicle (Wi) on Camera space are the same vehicle. The method is then operative to display the perspective view 740 with the collected data displayed in an opaque manner and the received data displayed in a solid manner. This perspective view may be displayed on a video screen, an active rear view mirror, on a windshield or window.

Figure 8:
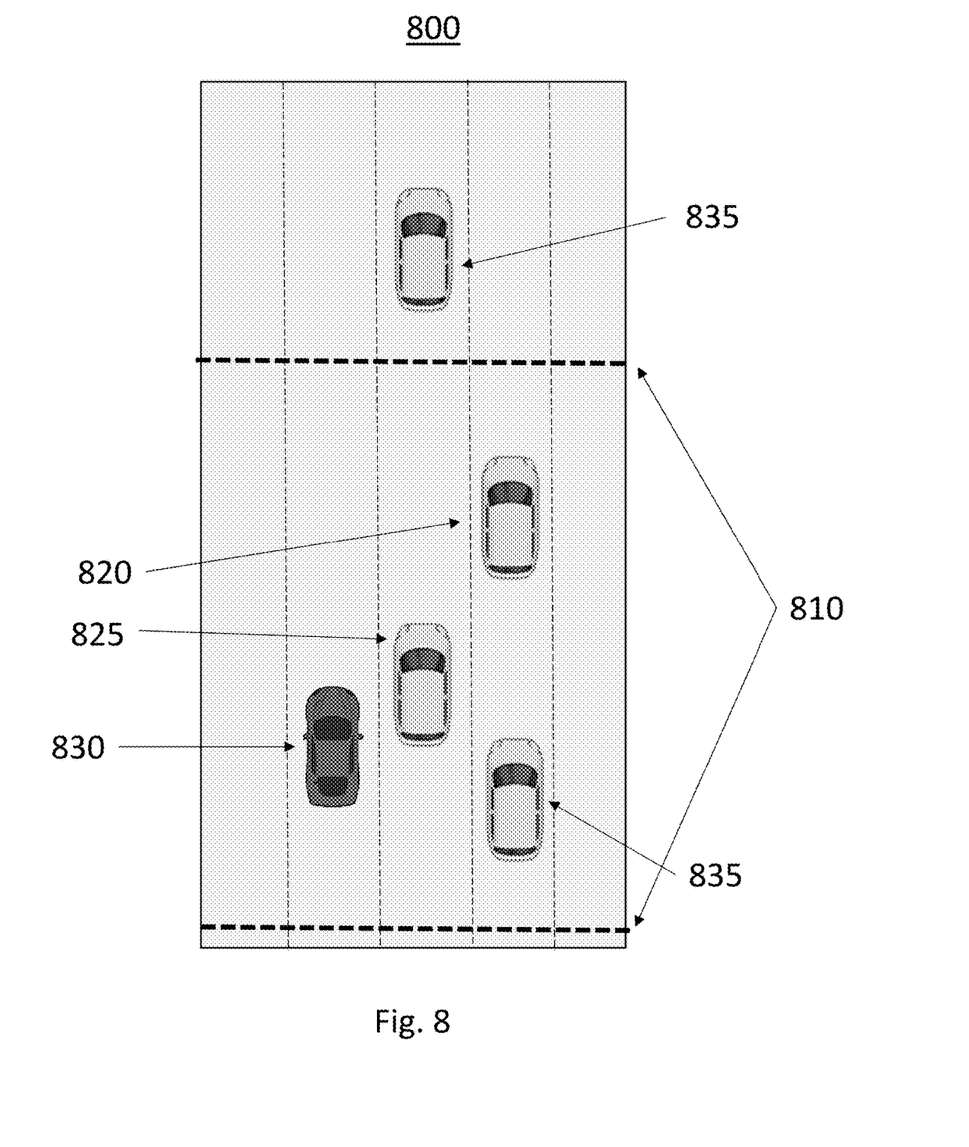
FIG. 8 shows an exemplary environment for path planning contention resolution via V2X Communication.

Turning now to FIG. 8 an exemplary environment for path planning contention resolution via V2X Communication 800 is shown. The problem addressed by the proposed system is how to resolve the path planning contention when multiple vehicles want to move to the same position without involve complex DLNN intention estimation computation. The proposed system is a decentralized, self-organizing V2X communication used to resolve such a conflict.

In the proposed system, the road is partitioned into road segments 810 for scalability management concerns. Within each segment, a leader vehicle is elected 830, based on a predetermined measure, such as the preferable hash value of the vehicle VIN number or other similar measures. Each vehicle 820, 825, 835 within the segment 810 broadcasts information concerning its currently location and kinematic information as well as its intended path. The leader vehicle may or may not broadcast its own information to the other vehicles. The information may be broadcast via DSRC, V2X communication or via a wireless network, such as WiFi or cellular communications network. If there is a conflict between the intended path of two or more vehicles, the leader vehicle 830 is operative to arbitrate any foreseeable conflict and to transmit an indication of the conflict to all vehicles, instruction for a vehicle to not use the intended path, and/or instructions of an alternative path that resolves the conflict. Vehicles in adjoining segments 835 would join with a different leader vehicle. When a leader moves out of a defined road segment, a new leader with be established within the segment and the leader will join the adjoining segment.

In the proposed system may utilize a vision enhanced V2V arrangement resident on a host vehicle wherein camera systems monitor and conditionally communicate detected vehicles. The longitudinal and lateral offset of target vehicle with respect to the host is converted to global coordinate frame. The system is operative to detect object overlap between V2V and camera and merge the information into a common data structure, such as a proximate object map. The system then conditionally communicate surrogate message, such as basic service message 1 (BSM part 1) to provide situation awareness detail for other V2V vehicles. In addition, the system may be operative to communicate surrogate BSM part 2 on hard braking or other detected events.

Figure 9:
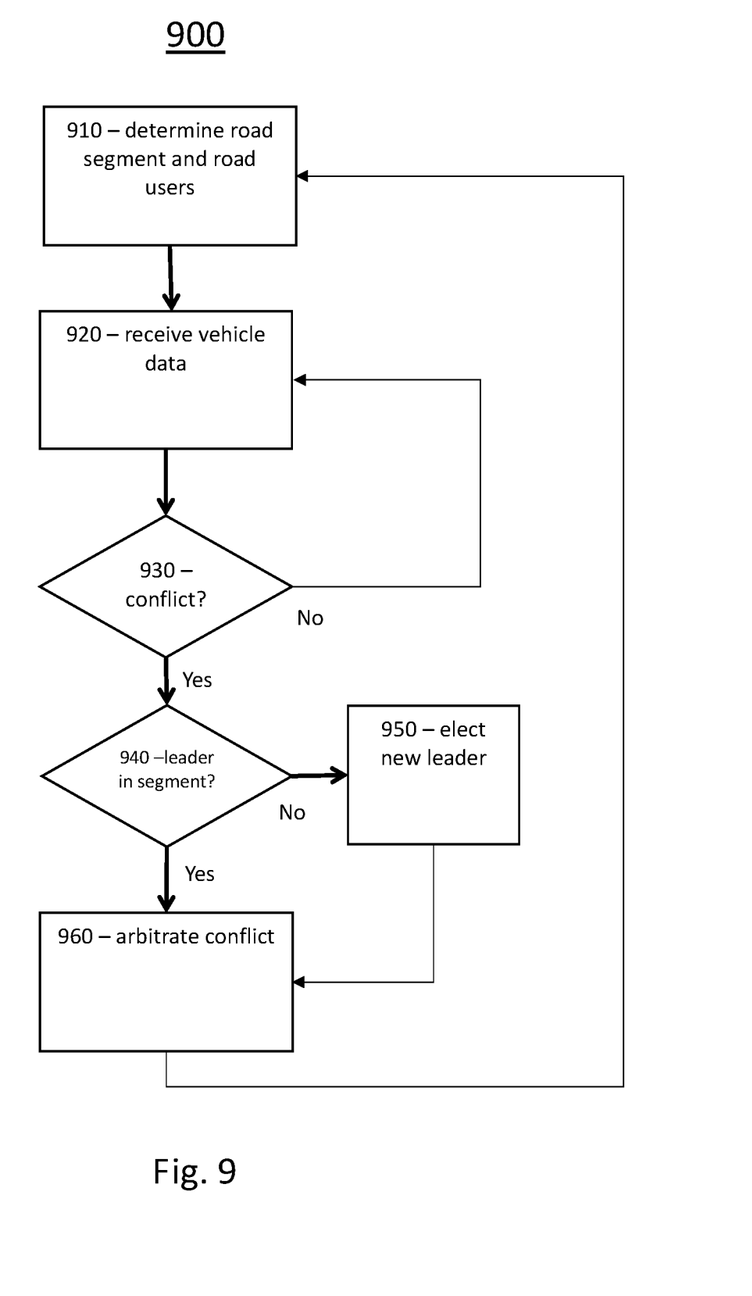
FIG. 9 shows a flow chart indicative of an exemplary method for path planning contention resolution via V2X Communication.

Turning now to FIG. 9, a method for path planning contention resolution via V2X Communication 900 is shown. The method is first operative to determine a road segment and to determine road users within the road segment 910. A road segment maybe determined in response to the location between previously elected leaders, or in may be determined in response to fixed geographical locations, such as every 1 kilometer of road. Alternatively, a road segment may move according to traffic flow, for example, a 1 kilometer segment may travel down an interstate at 60 miles per hour. Thus, vehicles traveling at the speed limit would stay within the same segment. The segment may be determined by an infrastructure apparatus, or may be determined an arbitrated by an elected vehicle within the segment.

The method is then operative to receive data from each vehicle 920. Within the segment, each vehicle broadcasts a message containing information such as its current location and kinematic information, as well as path planning information. Path panning information may include next step path intention, more detailed route information, or desired performance requests, such as desire to arrive at a specific location by a specific time, or to use a desired route.

The method is then operative to determine if a conflict is perceived 930. If no conflict is perceived, the method is operative to return to the receive data from each vehicle step 920. If a conflict is perceived, the method is operative to determine if the previous segment leader is still within the segment 940. If the previous leader is no longer in the segment, or is unable to perform the leadership duties, an in-time leader election process is conducted 950 in the segment based on a given election mechanism. The election mechanism may include earliest time stamp, e.g. earliest vehicle in the segment, vehicle identification number related, maximum capabilities, most available resources, or the like. The elected leader of the segment will arbitrate the conflicting parties on the previously agreed policy framework. A simple arbitration process could replace/enhance otherwise complicated Deep-Learning Neural-Network approach. The elected leader will further be operative to resolve any foreseeable conflict via V2X communications.

When a segment leader is established, either by the election process 950 or by virtue of previous segment leadership, the method is then operative to arbitrate the conflict 960 if the system is determined to be the segment leader. After resolving the perceived conflict, the method is operative to return to determining a road segment 910.

The method and system of an individual autonomous or non autonomous vehicle may superimpose a first set of the detected road users through ego-sensors, such as camera sensors or Lidar/Radar sensors, together with a second set of the detected road users by receiving V2X communications through these road users broadcast messages. The superimposed situation awareness map could be displayed to drivers or passengers for improving safety. Moreover, this information may be used to implement the host vehicles data map and as an input to the host vehicles autonomous control system.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An apparatus for performing a method comprising:
   a processor for
   determining a road segment;
   determining a first road user and a second road user within the road segment;
   receiving a first route data from the first road user and a second route data from the second road user;
   determining a conflict in response to the first route data and the second route data;
   determining a segment leader in response to determining the conflict wherein the segment leader is operative to arbitrate the conflict to generate an instruction; and
   transmitting the instruction in response to arbitrating the conflict and determining the segment leader.

2. The method of claim 1 wherein the segment leader is determined in response to a comparison of an attribute of the first road user and the second road user.

3. The method of claim 1 wherein the segment leader is determined in response to a length of time the first road user has been within the road segment.

4. The method of claim 1 wherein the segment leader is determined in response to a computational capability of the first road user.

5. The method of claim 1 further comprising receiving a third route data from a third road use and determining the third road user within the road segment.

6. The method of claim 1 wherein determining a road segment is performed in response to a speed limit of a road.

7. The method of claim 1 wherein the road segment is determined in response to a quantity of road users.

8. The method of claim 1 wherein a new segment leader is determined in response to the segment leader exiting the road segment.

9. The method of claim 1 wherein the instruction to the first road user is an indication not to use an intended route.

10. An apparatus comprising:
    a receiver from receiving a first route data from a first road user and a second route data from a second road user;
    a processor for determining a road segment, determining a first road user and a second road user within the road segment, determining a conflict in response to the first route data and the second route data, determining a segment leader in response to determining the conflict wherein the segment leader is operative to arbitrate the conflict to generate an instruction; and
    a transmitter for transmitting the instruction to the first road user and the second road user.

11. The apparatus of claim 10 wherein the segment leader is determined in response to a comparison of an attribute of the first road user and the second road user.

12. The apparatus of claim 10 wherein the segment leader is determined in response to a length of time the first road user has been within the road segment.

13. The apparatus of claim 10 wherein the segment leader is determined in response to a computational capability of the first road user.

14. The apparatus of claim 10 further comprising receiving a third route data from a third road use and determining the third road user within the road segment.

15. The apparatus of claim 10 wherein determining a road segment is performed in response to a speed limit of a road.

16. The apparatus of claim 10 wherein the road segment is determined in response to a quantity of road users.

17. The apparatus of claim 10 wherein a new segment leader is determined in response to the segment leader exiting the road segment.

18. The apparatus of claim 10 wherein the instruction to the first road user is an indication not to use an intended route.

19. An apparatus for performing a method of path planning contention resolution comprising:
    a processor for:
    receiving a first location data, a first operational data, and a first intended route data from a first road user and a second location data, a second operational data, and a second intended route data from a second road user;
    determining a user group in response to the first location data and the second location data;
    determining a conflict in response to the first intended route data and the second intended route data;
    determining a group leader in response to the first operational data and the second operational data wherein the group leader is operative to determine a resolution to the conflict; and
    transmitting the resolution to the first road user and the second road user.

20. The method of claim 19 wherein the first operational data comprises at least one of a vehicle identification number, a time stamp, and a processing capacity.

* * * * *